(12) United States Patent
Fu

(10) Patent No.: US 10,985,913 B2
(45) Date of Patent: Apr. 20, 2021

(54) METHOD AND SYSTEM FOR PROTECTING DATA KEYS IN TRUSTED COMPUTING

(71) Applicant: Alibaba Group Holding Limited, Grand Cayman (KY)

(72) Inventor: Yingfang Fu, Beijing (CN)

(73) Assignee: Alibaba Group Holding Limited, George Town (KY)

( * ) Notice: Subject to any disclaimer, the term of this patent is extended or adjusted under 35 U.S.C. 154(b) by 536 days.

(21) Appl. No.: 15/902,689

(22) Filed: Feb. 22, 2018

(65) Prior Publication Data
US 2018/0287792 A1    Oct. 4, 2018

(30) Foreign Application Priority Data

Mar. 28, 2017 (CN) .......................... 201710193994.7

(51) Int. Cl.
*H04L 9/08* (2006.01)
*H04L 9/14* (2006.01)
(Continued)

(52) U.S. Cl.
CPC .......... *H04L 9/0866* (2013.01); *H04L 9/0822* (2013.01); *H04L 9/0897* (2013.01);
(Continued)

(58) Field of Classification Search
CPC ... H04L 9/0866; H04L 9/0822; H04L 9/0897; H04L 9/14; H04L 9/3231; H04L 9/3239; H04L 9/3242; H04L 9/30; H04L 2209/72
See application file for complete search history.

(56) References Cited

U.S. PATENT DOCUMENTS

| 5,307,410 A | 4/1994 | Bennett |
| 5,675,648 A | 10/1997 | Townsend |

(Continued)

FOREIGN PATENT DOCUMENTS

| CN | 101222488 | 7/2008 |
| CN | 101741852 | 6/2010 |

(Continued)

OTHER PUBLICATIONS

Mark Hillery et al. "Quantum Secret Sharing", American Physical Society 1999.

(Continued)

*Primary Examiner* — Brian F Shaw
(74) *Attorney, Agent, or Firm* — Shun Yao; Park, Vaughan, Fleming & Dowler LLP

(57) ABSTRACT

One embodiment described herein provides a system and method for facilitating user access to encryption keys stored within a hardware module. During operation, a server coupled to the hardware module receives a key request from the user, the key request comprising a user identifier and a key identifier. The server receives a voice message from the user, extracts voice features from a voiceprint associated with the received voice message, looks up voice features stored within the hardware module based on the user identifier, and compares the extracted voice features with the voice features stored within the hardware module. In response to the extracted voice features matching the stored voice features, the server retrieves from the hardware module an encryption key based on the user identifier and the key identifier.

17 Claims, 11 Drawing Sheets

(51) Int. Cl.
*H04L 9/32* (2006.01)
*H04L 9/30* (2006.01)

(52) U.S. Cl.
CPC .............. *H04L 9/14* (2013.01); *H04L 9/3231* (2013.01); *H04L 9/3239* (2013.01); *H04L 9/3242* (2013.01); *H04L 9/30* (2013.01); *H04L 2209/72* (2013.01)

(56) References Cited

U.S. PATENT DOCUMENTS

| | | |
|---|---|---|
| 6,505,247 B1 | 1/2003 | Steger |
| 8,041,335 B2 | 10/2011 | Khetawat |
| 8,266,433 B1 | 9/2012 | Przykucki |
| 8,990,550 B1 | 3/2015 | Hushon |
| 9,077,577 B1 | 7/2015 | Ashrafi |
| 9,130,742 B2 | 9/2015 | Yao |
| 9,294,267 B2 | 3/2016 | Kamath |
| 9,323,901 B1 | 4/2016 | Nair |
| 9,698,979 B2 | 7/2017 | Armstrong |
| 9,830,467 B1 | 11/2017 | Harold |
| 9,887,976 B2 | 2/2018 | Hughes |
| 2001/0023416 A1 | 9/2001 | Hosokawa |
| 2005/0071632 A1 | 3/2005 | Pauker |
| 2005/0071677 A1 | 3/2005 | Khanna |
| 2005/0135620 A1 | 6/2005 | Kastella |
| 2005/0144440 A1 | 6/2005 | Catherman |
| 2005/0144484 A1 | 6/2005 | Wakayama |
| 2005/0259825 A1 | 11/2005 | Trifonov |
| 2006/0026693 A1 | 2/2006 | Bade |
| 2006/0056630 A1 | 3/2006 | Zimmer |
| 2007/0016794 A1 | 1/2007 | Harrison |
| 2007/0076889 A1 | 4/2007 | Derobertis |
| 2007/0147292 A1 | 6/2007 | Van Ewijk |
| 2007/0192598 A1 | 8/2007 | Troxel |
| 2008/0065881 A1 | 3/2008 | Dawson |
| 2008/0114983 A1 | 5/2008 | Sherkin |
| 2008/0123859 A1 | 5/2008 | Mamidwar |
| 2008/0165973 A1 | 7/2008 | Miranda Gavillan |
| 2008/0219449 A1 | 9/2008 | Ball |
| 2008/0222734 A1 | 9/2008 | Redlich |
| 2009/0019285 A1 | 1/2009 | Chen |
| 2009/0034733 A1 | 2/2009 | Raman |
| 2009/0055892 A1 | 2/2009 | Lu |
| 2009/0092252 A1 | 4/2009 | Noll |
| 2009/0106551 A1 | 4/2009 | Boren |
| 2009/0125444 A1 | 5/2009 | Cochran |
| 2009/0204812 A1 | 8/2009 | Baker |
| 2009/0262942 A1 | 10/2009 | Maeda |
| 2009/0271634 A1 | 10/2009 | Boult |
| 2010/0132015 A1 | 5/2010 | Lee |
| 2010/0169953 A1 | 7/2010 | Hofer |
| 2010/0199336 A1 | 8/2010 | Tan |
| 2010/0211787 A1 | 8/2010 | Bukshpun |
| 2010/0265077 A1 | 10/2010 | Humble |
| 2010/0277435 A1 | 11/2010 | Han |
| 2010/0299526 A1 | 11/2010 | Wiseman |
| 2011/0069972 A1 | 3/2011 | Wiseman |
| 2011/0099367 A1 | 4/2011 | Thom |
| 2011/0126011 A1 | 5/2011 | Choi |
| 2011/0167503 A1 | 7/2011 | Horal |
| 2011/0209202 A1 | 8/2011 | Otranen |
| 2011/0213979 A1 | 9/2011 | Wiseman |
| 2011/0231615 A1 | 9/2011 | Ober |
| 2012/0032781 A1* | 2/2012 | Moon .................... G06F 21/32 340/5.82 |
| 2012/0045002 A1 | 2/2012 | Zivkovic |
| 2012/0084570 A1 | 4/2012 | Kuzin |
| 2012/0087500 A1 | 4/2012 | Ukita |
| 2012/0166993 A1 | 6/2012 | Anderson |
| 2012/0177201 A1 | 7/2012 | Ayling |
| 2012/0210408 A1 | 8/2012 | Lu |
| 2012/0250863 A1 | 10/2012 | Bukshpun |
| 2012/0265892 A1 | 10/2012 | Ma |
| 2013/0083926 A1 | 4/2013 | Hughes |
| 2013/0101119 A1 | 4/2013 | Nordholt |
| 2013/0159704 A1* | 6/2013 | Chandrasekaran ... H04L 9/0897 713/156 |
| 2013/0208894 A1 | 8/2013 | Bovino |
| 2013/0219454 A1 | 8/2013 | Hewinson |
| 2013/0227286 A1 | 8/2013 | Brisson |
| 2013/0246641 A1 | 9/2013 | Vimpari |
| 2013/0251145 A1 | 9/2013 | Lowans |
| 2013/0259233 A1 | 10/2013 | Baba |
| 2013/0262873 A1* | 10/2013 | Read ..................... H04W 12/06 713/186 |
| 2013/0267204 A1* | 10/2013 | Schultz .................. G06F 21/32 455/411 |
| 2013/0308506 A1 | 11/2013 | Kim |
| 2013/0315395 A1 | 11/2013 | Jacobs |
| 2014/0068765 A1 | 3/2014 | Choi |
| 2014/0104137 A1 | 4/2014 | Brown |
| 2014/0141725 A1 | 5/2014 | Jesme |
| 2014/0173713 A1 | 6/2014 | Zheng |
| 2014/0237565 A1 | 8/2014 | Fleysher |
| 2014/0259138 A1 | 9/2014 | Fu |
| 2014/0281511 A1 | 9/2014 | Kaushik |
| 2014/0331050 A1 | 11/2014 | Armstrong |
| 2014/0351915 A1 | 11/2014 | Otranen |
| 2015/0046709 A1 | 2/2015 | Anspach |
| 2015/0062904 A1 | 3/2015 | Sanga |
| 2015/0089624 A1 | 3/2015 | Kim |
| 2015/0095987 A1 | 4/2015 | Potash |
| 2015/0134727 A1 | 5/2015 | Lee |
| 2015/0134947 A1 | 5/2015 | Varcoe |
| 2015/0181308 A1 | 6/2015 | Ducharme |
| 2015/0207926 A1 | 7/2015 | Brown |
| 2015/0222619 A1 | 8/2015 | Hughes |
| 2015/0236852 A1 | 8/2015 | Tanizawa |
| 2015/0270963 A1 | 9/2015 | Tanizawa |
| 2015/0271147 A1 | 9/2015 | Tanizawa |
| 2015/0288517 A1 | 10/2015 | Evans |
| 2015/0288542 A1 | 10/2015 | Ashrafi |
| 2015/0309924 A1 | 10/2015 | Chen |
| 2015/0317469 A1 | 11/2015 | Liu |
| 2015/0325242 A1 | 11/2015 | Lu |
| 2015/0326613 A1 | 11/2015 | Devarajan |
| 2015/0350181 A1 | 12/2015 | Call |
| 2015/0379261 A1 | 12/2015 | Daigle |
| 2015/0381363 A1 | 12/2015 | Teixeira |
| 2016/0013937 A1 | 1/2016 | Choi |
| 2016/0021068 A1 | 1/2016 | Jueneman |
| 2016/0080708 A1 | 3/2016 | Urata |
| 2016/0087946 A1 | 3/2016 | Yang |
| 2016/0105439 A1 | 4/2016 | Hunt |
| 2016/0127127 A1 | 5/2016 | Zhao |
| 2016/0149700 A1 | 5/2016 | Fu |
| 2016/0210105 A1 | 7/2016 | Ru |
| 2016/0226846 A1 | 8/2016 | Fu |
| 2016/0241396 A1 | 8/2016 | Fu |
| 2016/0248581 A1 | 8/2016 | Fu |
| 2016/0294783 A1 | 10/2016 | Piqueras Jover |
| 2016/0337329 A1 | 11/2016 | Sood |
| 2016/0359839 A1 | 12/2016 | Natividad |
| 2016/0366713 A1 | 12/2016 | Sonnino |
| 2017/0034167 A1 | 2/2017 | Figueira |
| 2017/0104588 A1 | 4/2017 | Camenisch |
| 2017/0214525 A1 | 7/2017 | Zhao |
| 2017/0230173 A1 | 8/2017 | Choi |
| 2017/0302448 A1 | 10/2017 | Luk |
| 2017/0324730 A1 | 11/2017 | Otranen |
| 2018/0048466 A1 | 2/2018 | Chen |
| 2018/0063709 A1 | 3/2018 | Morrison |
| 2018/0077449 A1 | 3/2018 | Herz |
| 2018/0262907 A1 | 9/2018 | Alanis |
| 2018/0351734 A1 | 12/2018 | Zhao |
| 2019/0103962 A1 | 4/2019 | Howe |

FOREIGN PATENT DOCUMENTS

| | | |
|---|---|---|
| CN | 102946313 | 2/2013 |
| CN | 104486307 | 4/2015 |
| CN | 104579694 | 4/2015 |
| CN | 104780040 | 7/2015 |

(56) References Cited

FOREIGN PATENT DOCUMENTS

| EP | 0962070 | | | 12/1999 | |
|----|---------|---|---|---------|---|
| EP | 3007478 | | | 4/2016 | |
| GB | 2446484 | A | * | 8/2008 | ........... H04L 9/0822 |
| WO | 2012098543 | | | 7/2012 | |
| WO | 2013026086 | | | 2/2013 | |
| WO | 2016070141 | | | 5/2016 | |

OTHER PUBLICATIONS

J G Rarity et al. "Ground to satellite secure key exchange using quantum cryptography", New Journal of Physics 2002.

Richard J Hughes et al. "Practical free-space quantum key distribution over 10 km in daylight and at night", New Journal of Physics 2002.

Baker et al. "Recommendation for Key Management—Part 1: General (Revision 3)", NIST Special Publication 800-57, Jul. 2012 (Year:2012).

Sufyan T. Faraj, "A Novel Extension of SSL/TLS Based on Quantum Key Distribution", Computer and Communication Engineering, 2008. ICCCE 2008. International Conference on, IEEE, Piscataway, NJ, USA, May 16, 2008, pp. 919-922.

Tien-Sheng Lin, et al., Quantulm Aulthentication and Secure Communication Protocols, 2006 IEEE (Year:2006).

Charles H. Bennett et al., Quantum cryptography: Public key distribution and coin tossing, www. elsevier.com/locate/tcx, 2014 (Year: 2014).

R. Alleaume et al., Using Quantum key distribution for cryptographic purposes: A survey, www.elsevier.com/locate/tcs, 2009 (Year:2009).

Toung-Shang Wei et al., Comment on "Quantum Key Distribution and Quantum Authentication Based on Entangled State", Springer, 2011 (Year: 2011).

Ivan Damgard et al., Secure Identification and QKD in the bounded-quantum-storage model, www.elsevier.com/locate/tcs, 2009 (Year: 2009).

Valerio Scarani et al., The black paper of quantum cryptography: Real implementation problems, www.elsevier.com/locate/tcs, 2014.

Jung-Lun Hsu et al., Dynamic quantum secret sharing, Springer, 2012.

Ci-Hong Liao et al., Dynamic quantum secret sharing protocol based on GHZ state, Springer, 2014.

Xugang Ren et al., A Novel Dynamic User Authentication Scheme, 2012 International Symposium on Communications and Information Technologies, 2012.

Phyllis A. Schneck et al., Dynamic Authentication for High-Performance Networked Applications, 1998 IEEE.

Lanjun Dang, An Improved Mutual Authentication Scheme for Smart Card Secure Messaging, Proceedings of the IEEE International Conference on E-Commerce Technology for Dynamic E-Business (CEC-East'04), 2004.

Wenjie Liu, et al., Authenticated Quantum Secure Direct Communication with Qutrits, Fourth International Conference on Natural Computation, IEEE 2008.

* cited by examiner

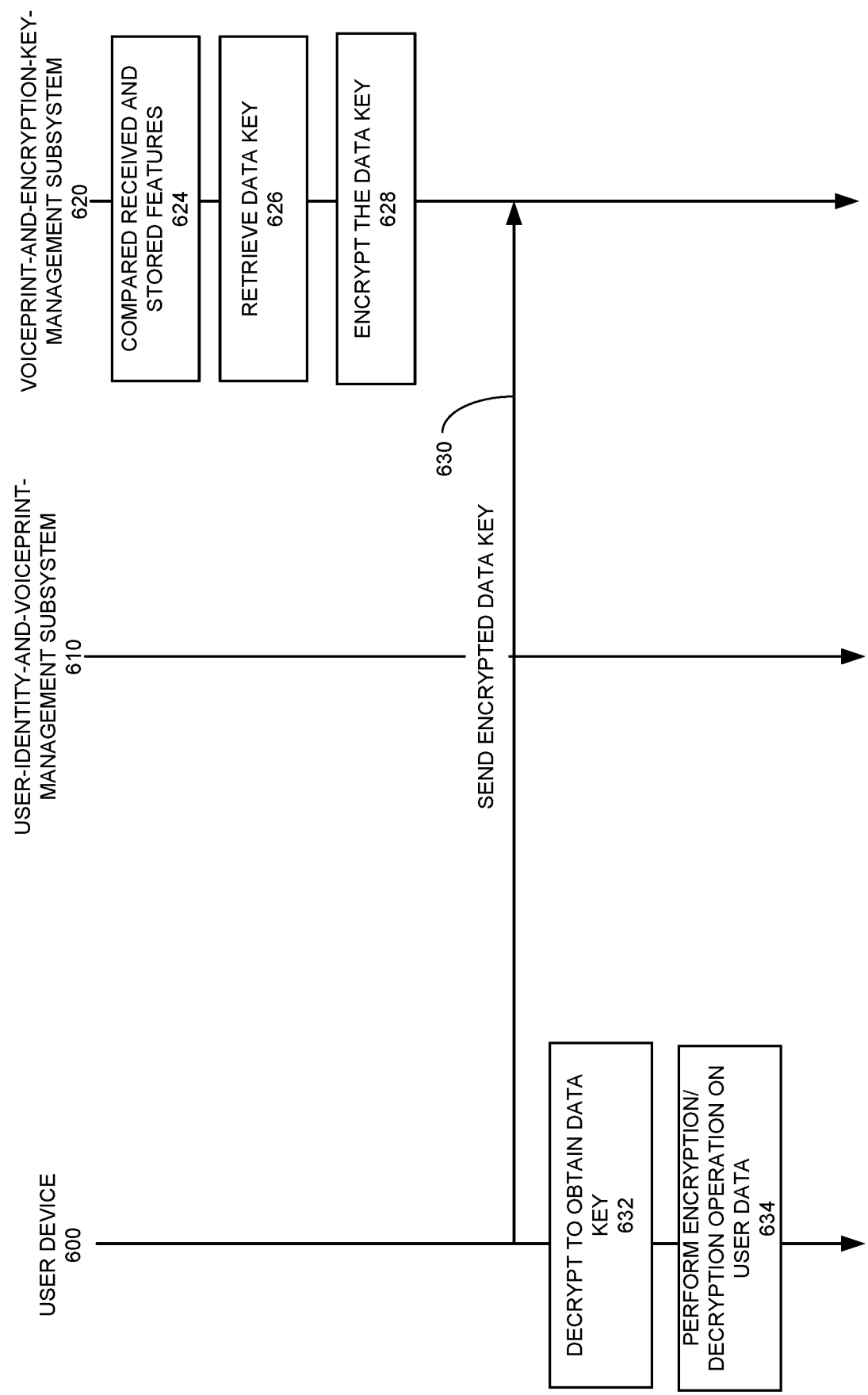

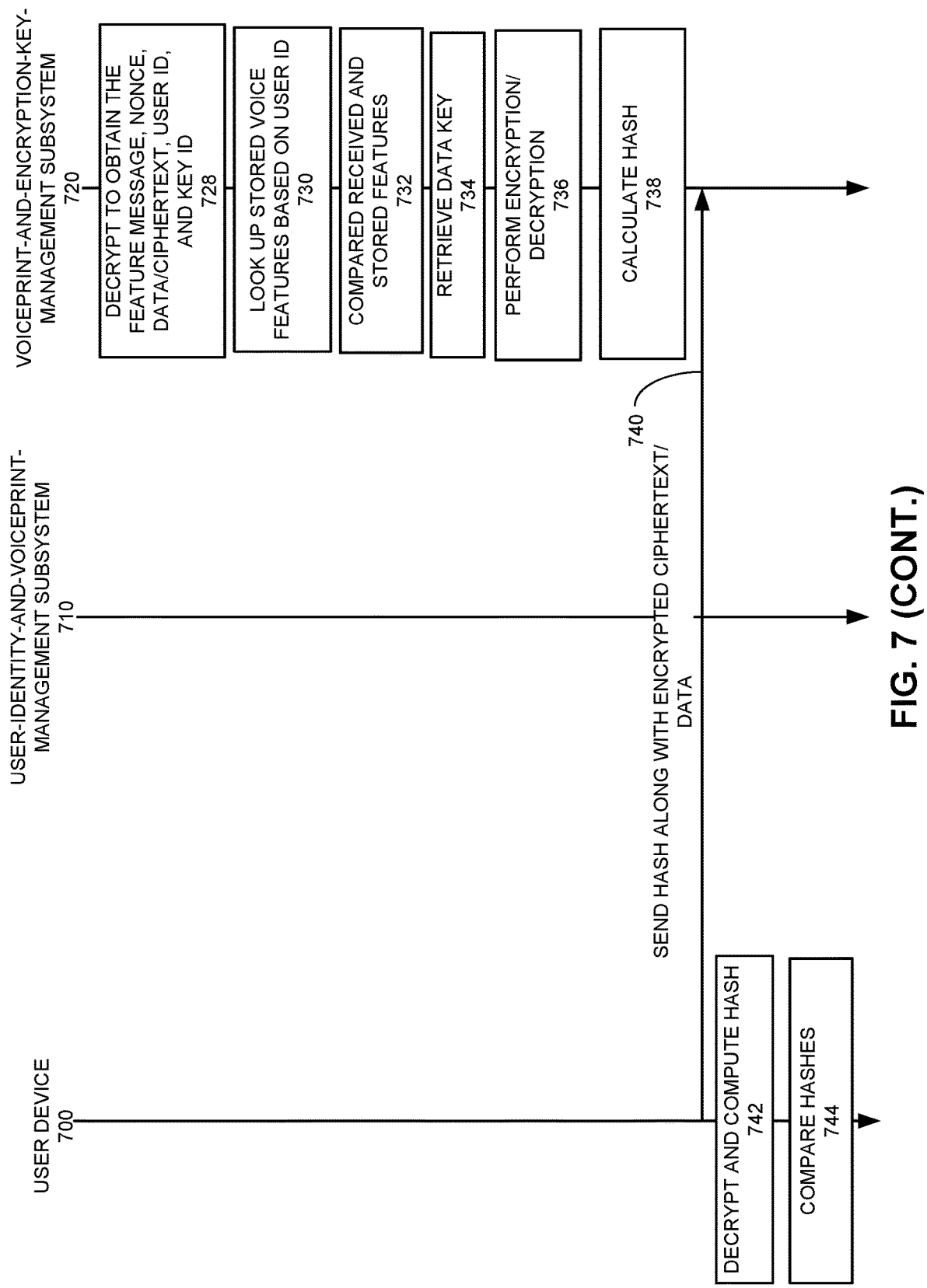

METHOD AND SYSTEM FOR PROTECTING DATA KEYS IN TRUSTED COMPUTING

RELATED APPLICATION

Under 35 U.S.C. § 119, this application claims the benefit and right of priority of Chinese Patent Application No. 201710193994.7, filed on 28 Mar. 2017.

BACKGROUND

Field

This disclosure is generally related to communication security based on trusted computing. More specifically, this disclosure is related to a system and method for maintaining and protecting encryption keys in a computing environment with hardware-enabled security.

Related Art

With the exponential growth in data communication and telecommunication over computer networks including the Internet, the technologies for data security to protect private information passed on the computer networks from eavesdropping and other attacks have also been constantly improving and evolving.

Data encryption technologies play an important role in protecting data confidentiality as it is stored on computer systems and transmitted over the Internet or other computer networks. Data encryption translates data into another form, or code, so that only people with access to a secret key (formally called a decryption key) or password can read it. Encrypted data is commonly referred to as ciphertext, while unencrypted data is called plaintext.

Once data is secured through encryption, the encryption keys themselves must be guarded from theft or accidental loss. Management and protection of the encryptions keys can become an essential task for ensuring data security.

SUMMARY

One embodiment described herein provides a system and method for facilitating user access to encryption keys stored within a hardware module. During operation, a server comprising the hardware module receives a key request from the user, the key request comprising a user identifier and a key identifier. The server receives a voice message from the user, extracts voice features from a voiceprint associated with the received voice message, looks up voice features stored within the hardware module based on the user identifier, and compares the extracted voice features with the voice features stored within the hardware module. In response to the extracted voice features matching the stored voice features, the server retrieves from the hardware module an encryption key based on the user identifier and the key identifier.

In a variation on this embodiment, the server transmits the encryption key to the user, thereby allowing the user to perform encryption or decryption operations on user data using the encryption key.

In a variation on this embodiment, the key request further comprises to-be-encrypted user data or to-be-decrypted ciphertext. The server performs an encryption or decryption operation on the to-be-encrypted user data or the to-be-decrypted ciphertext, respectively, using the retrieved encryption key.

In a further variation on this embodiment, the key request further comprises a nonce. The server encrypts, using a public key associated with the user, output of the encryption or decryption operation; calculates a hash value based on the output of the encryption or decryption operation and the nonce; and transmits the encrypted output of the encryption or decryption operation and the hash value to the user, thereby allowing the user to verify integrity of the output of the encryption or decryption operation.

In a variation on this embodiment, the hardware module comprises a Trusted Platform Module (TPM), a Trusted Platform Control Module (TPCM), or a hardware security module (HSM).

In a variation on this embodiment, the server generates a voice-feature message based on the extracted voice features, encrypts the voice-feature message using a public key associated with the hardware module, and sends the encrypted voice-feature message to the hardware module.

In a variation on this embodiment, the server further receives from the user a request to set up a user account, displays to the user a random alphanumeric string, receives a voice input from the user based on the displayed alphanumeric string, extracts a second set of voice features from a voiceprint associated with the voice input, and stores the extracted second set of voice features in the hardware module.

BRIEF DESCRIPTION OF THE FIGURES

In the figures, like reference numerals refer to the same figure elements.

DETAILED DESCRIPTION

Figure 1:
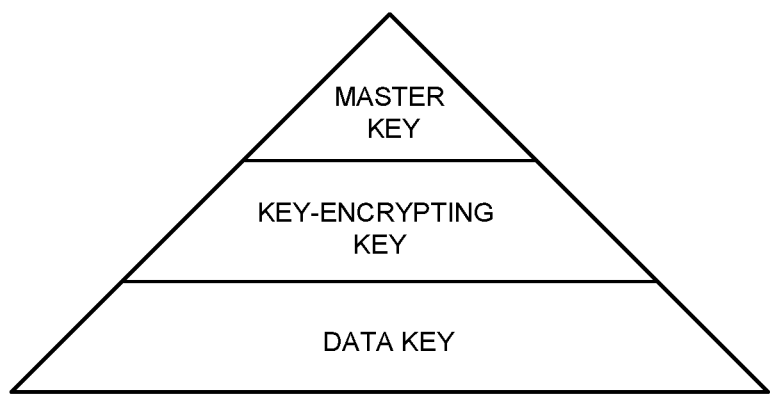
FIG. 1 illustrates the three-level hierarchy of keys defined by the ANSI X9.17 standard.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

In this disclosure, a method and system is provided for managing and protecting encryption keys in a computing environment where hardware-based security measures are implemented, such as in trusted computing or in financial networks where hardware security modules (HSMs) are implemented. More specifically, the encryption-key-protection system uses a user's voice to authenticate the user to allow the user to retrieve, from a trusted platform module (TPM) associated with the encryption-key-protection system, an encryption key. Note that, such an encryption key has been generated by the TPM for the user and can be protected by the storage root key of the TPM. Moreover, when an authorized user registers with the encryption-key-protection system, the encryption-key-protection system receives a first voice sample from the user, extracts voice features from the voiceprint of the first voice sample, and stores the extracted voice features. The stored voice features can be mapped to the user's account ID. Subsequently, when the user needs the encryption key for data encryption/decryption purposes, the user can submit a key request that includes the user's account ID and a key ID. In response, the encryption-key-protection system requests the user to provide a second voice sample and extracts voice features from the voiceprint of the second voice sample. The system can then compare the stored voice features with the voice features extracted from the second voice sample in order to authenticate the user. Once the user is authenticated, the system can retrieve and return the encryption key to the user. In one embodiment, the system may perform the encryption/decryption operation and return the encryption/decryption result to the user.

In this disclosure, an entity is also referred to as a trusted entity (e.g., a trusted server or a trusted client) if the entity is equipped with modules (e.g., hardware or software modules) that can enable trusted computing. Without specifying, it is assumed that all entities are trusted-computing enabled.

In this disclosure, expression $[Y]_X$ can be used to indicate encrypting a message Y using an encryption key X.

Key-Security Based on Hardware-Security Modules

One approach for ensuring data security is to use hardware security modules (HSMs). An HSM is a dedicated crypto processor that is specifically designed for the protection of the crypto key lifecycle. HSMs act as trust anchors that protect the cryptographic infrastructure of some of the most security-conscious organizations (e.g., financial service providers) in the world by securely managing, processing, and storing cryptographic keys inside a hardened, tamper-resistant device. Typical HSMs can come in the form of a plug-in card or an external device that attaches directly to a computer or network server.

To ensure service security, many financial service providers (e.g., banks) implement key-security measures in compliance with the ANSI X9.17 standard, which is aimed at the distribution of secret keys. The standard defines a three-level hierarchy of keys, as shown in FIG. 1. The highest level can include the master key (MK) or local master key (LKM) of the HSM, the middle level can include the key-encrypting keys (also called key-exchange keys), and the lowest level can include data keys.

The MKs can be stored within the HSM and can be used to protect various keys stored outside of the HSM. An MK can be a triple DES (3DES) key with a length of 128 bits. Compared to other types of keys, the MKs are changed less often and are always distributed manually in a very secure manner. The key-encrypting keys are used to encrypt the data keys to ensure key-distribution security. Two nodes within a local or shared network may use different key-encrypting keys to achieve distributed key management. The key-encrypting keys can be changed periodically. When stored locally, the key-encrypting keys can be encrypted with the master keys or directly stored in the HSM. The data keys are used for bulk encryption and are changed on a per-session or per-day basis. New data keys are encrypted with the key-encrypting keys and distributed to the users. Exemplary data keys can include message authentication key (MAK), PIN encryption key (PEK), terminal master key (TMK), etc.

Figure 2:
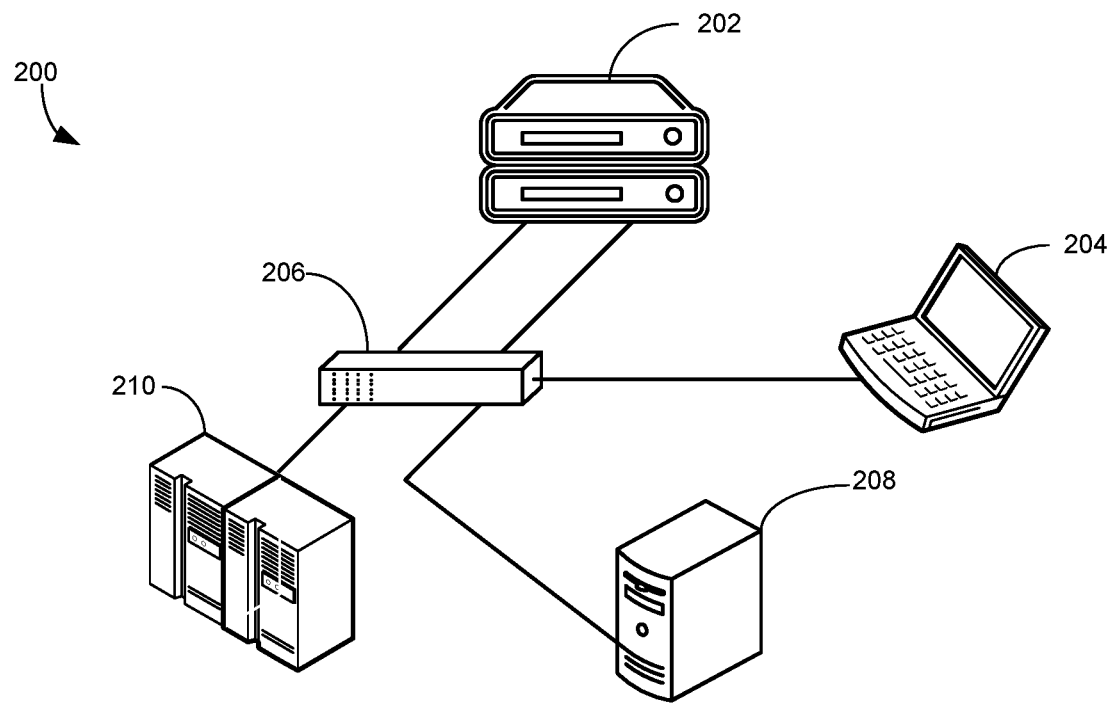
FIG. 2 shows an exemplary implementation of the hardware security module.

FIG. 2 shows an exemplary implementation of the hardware security module. System 200 can include HSM 202, client machine 204, switch 206, and a number of application servers, such as servers 208 and 210. One of the application servers (e.g., server 210) can be installed with the authorization system. When a user of client machine 204 wishes to obtain encryption keys, the user can send his password as well as digital certification to the authorization server, which can authenticate the server and allows the encryptions to be sent to an application server (e.g., server 208) for data encryption/decryption operations.

However, the encryption keys often are sent from HSM 202 to server 208 in the form of plaintext, thus facing certain risk of being intercepted. Moreover, users are authenticated using passwords and/or digital certificates, meaning that additional equipment may be needed for management of the passwords and digital certificates.

Trusted Computing

Another approach for protecting encryption keys is based on trusted computing. The core of trusted computing is the root of trust and the chain of trust. In trusted computing, the root of trust can be factory-installed hardware or firmware, such as the Trusted Platform Module (TPM). A TPM can be implemented as dedicated, cost-effective crypto-chips. A TPM can be physically connected to the computation platform and coupled to the CPU (central processing unit) via external buses. For example, the TPM on a personal computer (PC) can be mounted onto the main board of the PC and connected via a Low Pin Count (LPC) bus. In addition to storing the information for authenticating the platform, a TPM can also be used to store platform measurements that help ensure that the platform remains trustworthy. Authentication (ensuring that the platform can prove that it is what it claims to be) and attestation (a process helping to prove that a platform is trustworthy and has not been breached) are necessary steps to ensure safer computing in all environments.

The chain of trust is the iterative means to extend the boundary from the root of trust. The trustworthiness of a currently running component is based on the trustworthiness of a previously running component. Starting from the root of trust (also known as the trust anchor), if each time the computational environment of the platform changes (e.g., the running of certain codes), the trust can be maintained, thus establishing a reliable chain of trust, the platform can be viewed as trustworthy by local and remote entities.

Figure 3:
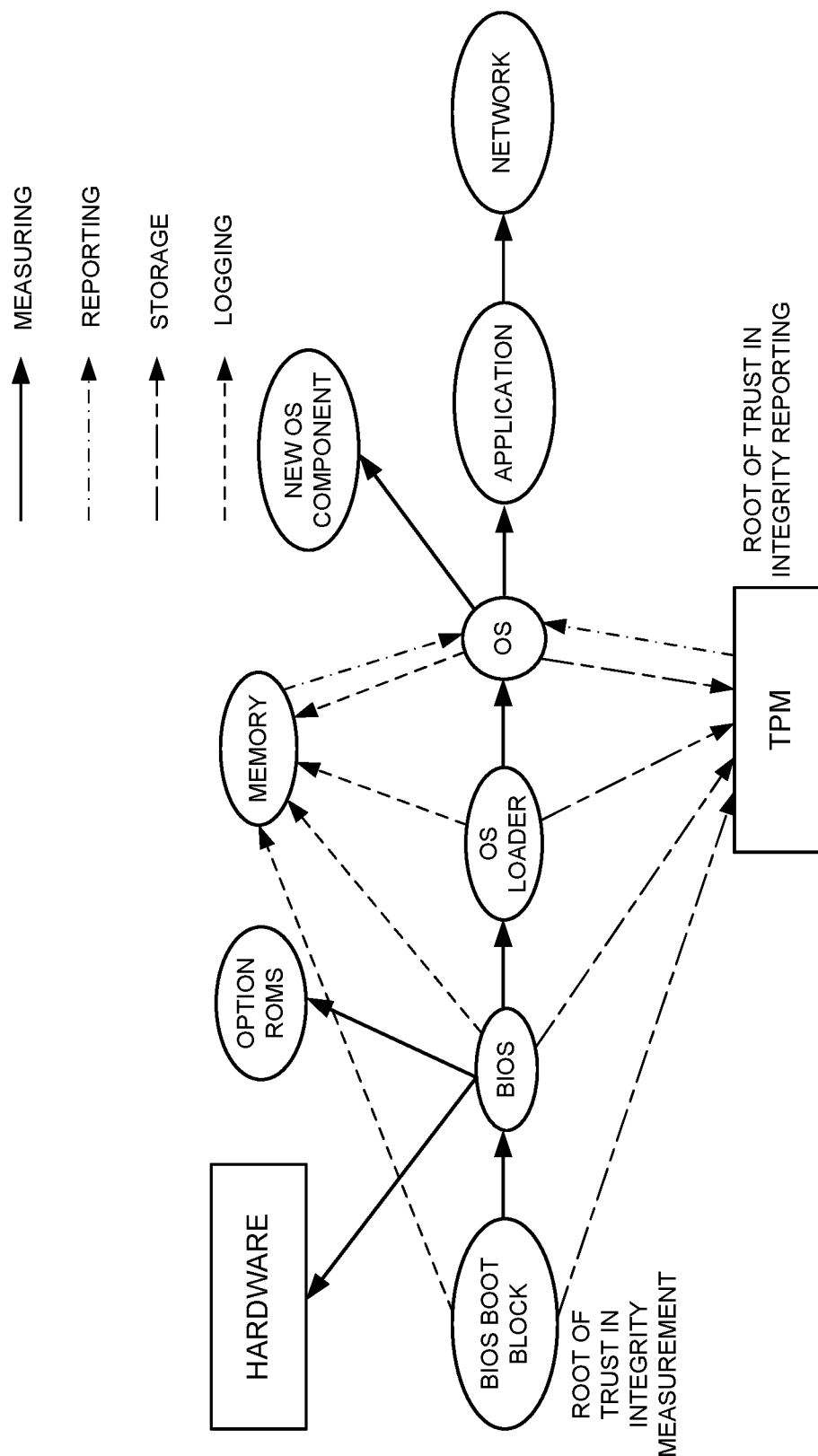
FIG. 3 illustrates the chain of trust in a PC as defined by the Trusted Computing Group.

Trusted computing technologies can include trusted measurement, trusted reporting, trusted storage, and trusted networking. FIG. 3 illustrates the chain of trust in a PC as defined by the Trusted Computing Group. More specifically, FIG. 3 shows the chain of trust for measuring, reporting, storage, and logging.

In addition to TPMs, Trusted Platform Control Modules (TPCMs) have also been developed. TPM was a subordinate device and the root of trusted measurement was put into BIOS (as shown in FIG. 2), which faces the threat of being tampered with. TPCM incorporates into the module the root of trusted measurement, thus protecting the root and original point of measurement and modifying the boot and measurement sequence. Accordingly, a chain of trust can be established using the TPCM chip as the trust anchor, thus allowing the TPCM chip to control the boot, I/O, and provisioning of the system.

During the operation of the computing platform, the TPCM needs to ensure the integrity of the next level executable code before the system transfers control to the next level executable code. The control of the system continues to be transferred to subsequent levels of executable code, thus establishing the chain of trust. More specifically, the TPCM or the TPM can start the boot process from a trusted condition and extend this trust until the operating system has fully booted and applications are running.

On a trusted platform, the data encryption keys can be stored in the TPM or TPCM, protected using the storage root key. When a user needs to use the encryption keys, he can send a request along with his credential (e.g., user ID and password) to gain access to the encryption keys.

Encryption-Key-Protection System

As discussed in the previous sections, although the hardware modules, such as the HSM and the TPM, can protect the encryption keys while they are kept within the physical boundary of the modules, user access to these keys often requires passwords and/or digital certificates. Additional hardware equipment may be needed to maintain and manage the passwords and/or digital certificates, complicating the system requirements. Lack of such equipment may result in inaccessible encryption keys, in the event of the user forgetting the password. To solve this problem, in some embodiments, instead of using a password to authenticate the user and grant the user access to the encryption keys, the system uses the user's voice or voiceprint to authenticate the user.

A voiceprint can also be referred to as the spectrogram of a voice, which is a visual representation of the spectrum of frequencies of sound as they vary with time. Because each individual can have a unique physical configuration of throat and mouth, the voiceprint of each individual can also be unique. Hence, a user can be identified by his voiceprint in a way similar to identifying the user using his fingerprint. In some embodiments, the user can access the hardware modules that manage and maintain the encryption keys using his voice.

Figure 4:
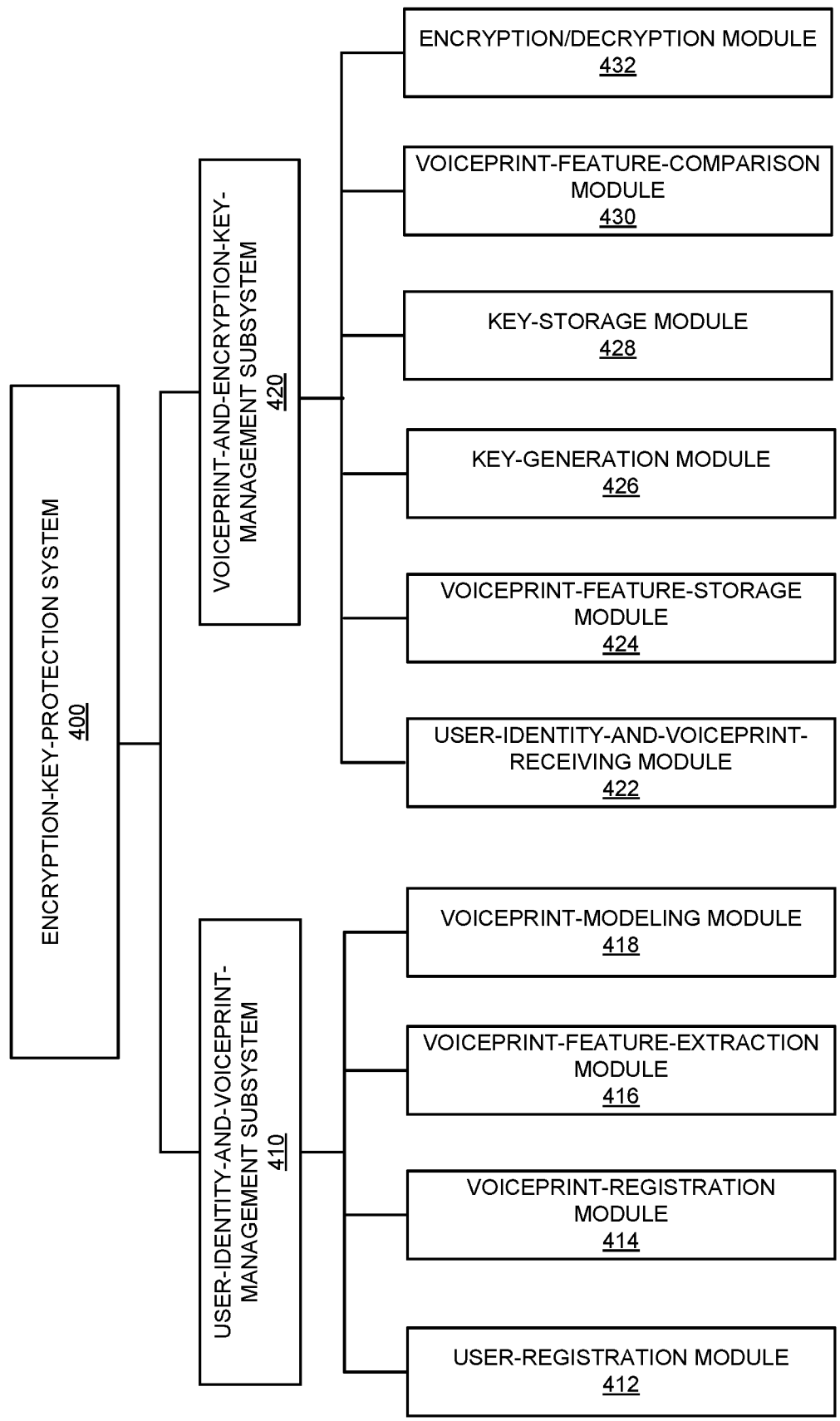
FIG. 4 illustrates the hierarchical architecture of an exemplary encryption-key-protection system, according to one embodiment.

FIG. 4 illustrates the hierarchical architecture of an exemplary encryption-key-protection system, according to one embodiment. Encryption-key-protection system 400 can include user-identity-and-voiceprint-management subsystem 410 and voiceprint-and-encryption-key-management subsystem 420. More specifically, user-identity-and-voiceprint-management subsystem 410 can be implemented as modules located outside of the hardware module that enforces security rules (e.g., an HSM or a TPM). On the other hand, voiceprint-and-encryption-key-management subsystem 420 can be implemented as modules located within the hardware module that enforces security rules. In some embodiments, voiceprint-and-encryption-key-management subsystem 420 can be located within the TPM of a trusted platform.

User-identity-and-voiceprint-management subsystem 410 can include a number of modules that manage user identities and voiceprints, such as user-registration module 412, voiceprint-registration module 414, voiceprint-feature-extraction module 416, and voiceprint-modeling module 418.

User-registration module 412 allows a user to register an account by submitting identity information (e.g., name, date of birth, email address, etc.) associated with the user account. In some embodiments, user-registration module 412 can establish a user ID (denoted $U_{ID}$) for the user. The user ID can be selected by the user or assigned by user-registration module 412.

Voiceprint-registration module 414 allows the user to register his or her voice as an authentication mechanism with the system. In some embodiments, in response to receiving from a user device a request for enabling voiceprint-based authentication, voiceprint-registration module 414 can generate a random alphanumeric string of a certain length. In some embodiments, the length of the string can be determined. In some embodiments, the length of the string can also be random. Voiceprint-registration module 414 can be configured to display such a random string to the user and receive, via a microphone, the user's voice when the user reads the random string. Voiceprint-registration module 414 can also record the received the user's voice.

Voiceprint-feature-extraction module 416 can be responsible for sampling and processing the recorded user's voice. In some embodiments, voiceprint-feature-extraction module 416 can generate a voiceprint (also referred to as a spectrogram) based on the recorded user's voice and extract features from the voiceprint. The extracted features can be used to characterize the physiological aspects of a speech production system including vocal tract and source. Voiceprint-modeling module 418 can establish a model based on the extracted features of the voiceprint. In some embodiments, a machine-learning technique can be used to extract features from the voiceprint and to model the voiceprint based on the extracted features. For example, various feature-extraction algorithms can be used, including but not limited to: linear predictive analysis (LPC), mel-frequency cepstral coefficients (MFCC), wavelet-based features, using wavelet transformation (WT), non-negative matrix factorization (NMF), artificial neural network (ANN), etc.

Voiceprint-and-encryption-key-management subsystem 420 can include a number of modules that manage the voiceprint features and encryption keys, including user-identity-and-voiceprint-receiving module 422, voiceprint-feature-storage module 424, key-generation module 426, key-storage module 428, voiceprint-feature-comparison module 430, and encryption/decryption module 432.

User-identity-and-voiceprint-receiving module 422 can receive, during user account initialization, identity information of a user and voiceprint features of the particular user. While receiving the user identity information and the voiceprint features of the user, user-identity-and-voiceprint-receiving module 422 ensures that the one-to-one mapping relationship is maintained. The voiceprint features can then be stored in voiceprint-feature-storage module 424 and indexed using the user ID ($U_{ID}$). In some embodiments, to ensure security, the voiceprint features can be protected using the storage root key.

Key-generation module 426 can be responsible for generating, according to the trusted computing standard, encryption keys that can be used by a user (which can be identifiable by a unique $U_{ID}$) for encrypting user data. Each encryption key can be identified by a unique key identifier ($key_{ID}$). Subsequent to the generation of the encryption keys, the system can return the key identifiers to the user. In addition to encryption keys, key-generation module 426 can also generate a public/private key pair for the user to enable secure communication between the user and encryption-key-protection system 400. The public key ($U_{PK}$) of the key pair can be sent to the user and the private key of the key pair can be stored in key-storage module 428.

In addition, key-storage module 428 can be responsible for storing the encryptions generated for the user, which can be protected using the storage root key. When storing the encryption keys, the system keeps track of the mapping relationship among the user ID, the key ID, and the keys.

Voiceprint-feature-comparison module 430 can be responsible for comparing subsequently received user voiceprint features with the user voiceprint features stored in voiceprint-feature-storage module 424 in order to authenticate the user. Once a user is authenticated, encryption/decryption module 432 can perform the encryption/decryption operations requested by the user. Alternatively, the encryption key can be sent to the user to allow the user to perform the encryption/decryption operations.

Operations of the Encryption-Key-Protection System

Figure 5:
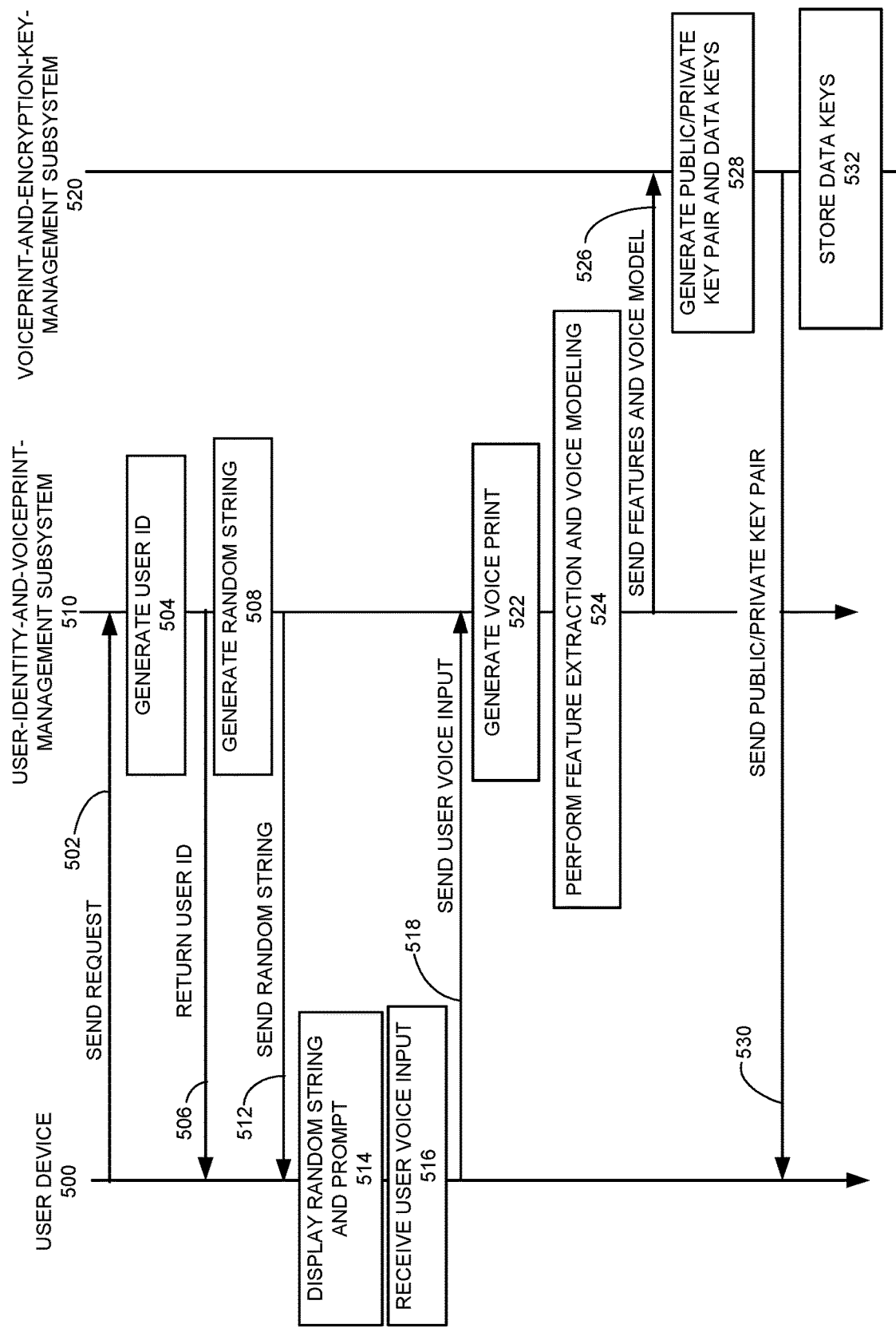
FIG. 5 illustrates an exemplary process for initializing a user account, according to one embodiment.

FIG. 5 illustrates an exemplary process for initializing a user account, according to one embodiment. During operation, a user can send, via user device 500, a request for establishing a voice-accessible user account to user-identity-and-voiceprint-management subsystem 510 (operation 502). In some embodiments, the request can also include certain user identity information, such as name, birthdate, email address, phone number, Social Security number, etc. User device 500 can be any type of computing device that can receive a voice input, such as a smartphone or tablet computer with a built-in microphone, or a laptop computer coupled to an external microphone via a USB port.

In response to the request, user-identity-and-voiceprint-management subsystem 510 generates a user ID (denoted $U_{ID}$) (operation 504) and returns the $U_{ID}$ to user device 500 (operation 506). Note that the $U_{ID}$ can also be generated based on the user's input.

User-identity-and-voiceprint-management subsystem 510 can also generate a random alphanumeric string (operation 508) and sends the random string to user device 500 (operation 512). The length of the random string can be predetermined or random, but with a minimum length to ensure that the system has collected sufficient voice information for accurate modeling. In some embodiments, the minimum length of the random string is set in such a way that the user's voice input can last at least a few seconds (e.g., between 2 and 10 seconds). User device 500 displays the random string along with a prompt for the user to read the random string (operation 514). User device 500 then receives the user's voice input (operation 516) and sends the user's voice input to user-identity-and-voiceprint-management subsystem 510 (operation 518).

User-identity-and-voiceprint-management subsystem 510 can generate a voiceprint of the received user's voice input (operation 522) and perform feature extraction and voice modeling based on the received user's voice input (operation 524). The extracted features and the voice model can then be sent along with the $U_{ID}$ to voiceprint-and-encryption-key-management subsystem 520 (operation 526), which securely stores the voiceprint features and model. Note that voiceprint-and-encryption-key-management subsystem 520 is located within the security hardware, such as the TPM. Voiceprint-and-encryption-key-management subsystem 520 can generate a public/private key pair (denoted U_PK and U_SK) and a number of data keys for the user (operation 528). The public/private key pair can be used for secure communication between the user and voiceprint-and-encryption-key-management subsystem 520, and the data keys can be used by the user for data encryption. Voiceprint-and-encryption-key-management subsystem 520 then sends the public/private key pair to the user (operation 530) and securely stores the data keys in the TPM (operation 532).

Figure 6:
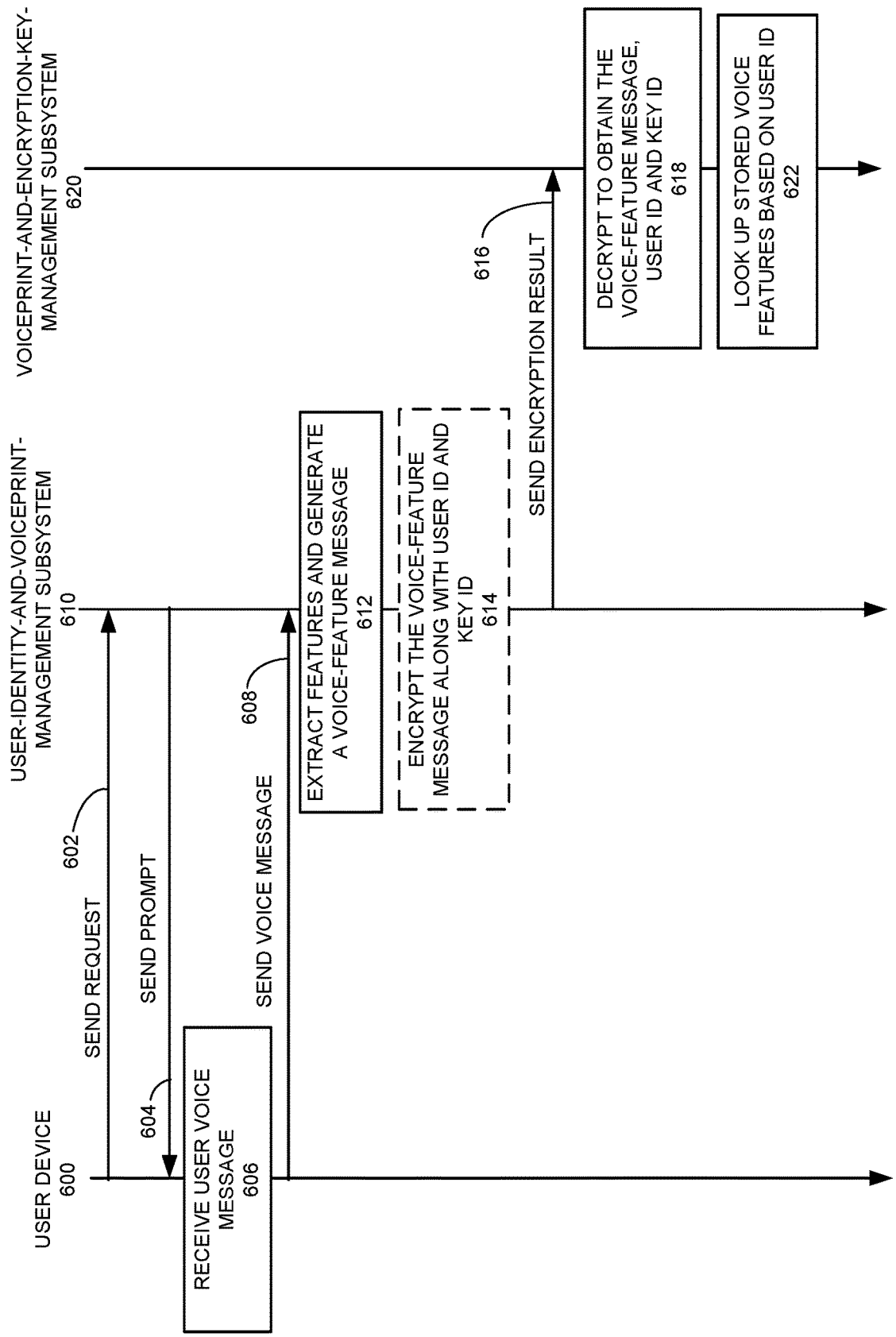
FIG. 6 illustrates an exemplary process for secure distribution of data keys, according to one embodiment.

After the user account has been initialized, the user can access the data keys stored in the TPM using his voice. In some embodiments, the user may obtain a copy of the data key and performs, on a local machine, encryption/decryption operations. FIG. 6 illustrates an exemplary process for secure distribution of data keys, according to one embodiment.

During operation, a user can send, via user device 600, a key request to user-identity-and-voiceprint-management subsystem 610 (operation 602). In some embodiments, the key request can include the user ID ($U_{ID}$) and a handle or identifier of the key (key$_{ID}$). In response to the request, user-identity-and-voiceprint-management subsystem 610 sends a prompt to user device 600 (operation 604), prompting the user to submit a voice message. In some embodiments, the prompt may include a randomly generated string for the user to read. In some embodiments, the prompt may include an instruction, indicating to the user the minimum time duration for the voice message. For example, the prompt may instruct the user to provide a voice message of any kind that lasts at least 5 seconds.

In response, the user provides a voice message via a voice-input module coupled to or located on user device 600 (operation 606), and user device 600 sends the voice message to user-identity-and-voiceprint-management subsystem 610 (operation 608). User-identity-and-voiceprint-management subsystem 610 extracts features from the voiceprint of the received voice message and generates a voice-feature message (denoted msg) comprising the extracted feature (operation 612). User-identity-and-voiceprint-management subsystem 610 can optionally encrypt, using the public key of voiceprint-and-encryption-key-management subsystem 620 and an asymmetric encryption technique, the voice-feature message along with the user ID and key ID (operation 614), and send the encryption result to voiceprint-and-encryption-key-management subsystem 620 (operation 616). The encryption result can be denoted as $\{msg, U_{ID}, key_{ID}\}_{M\_PK}$, where M_PK is the public key of voiceprint-and-encryption-key-management subsystem 620. Note that voiceprint-and-encryption-key-management subsystem 620 is located within the security hardware, such as the TPM.

In response to receiving the encryption result, voiceprint-and-encryption-key-management subsystem 620 can decrypt, using its own private key, to obtain the plaintext voice-feature message, user ID, and key ID (operation 618). Voiceprint-and-encryption-key-management subsystem 620 can then perform a lookup based on the user ID to obtain stored features of the user's voiceprint (operation 622). Voiceprint-and-encryption-key management subsystem 620 can then compare the received features of the user's voiceprint with the stored features (operation 624). More specifically, the system can retrieve, from the voiceprint-feature-storage module, features of the voiceprint corresponding to the user ID. If the received features of the user's voiceprint match the stored features of the user's voiceprint, the user's identity is verified, voiceprint-and-encryption-key-management subsystem 620 retrieves the data key corresponding to the user ID and key ID (operation 626). Otherwise, the process terminates.

Voiceprint-and-encryption-key-management subsystem 620 can encrypt, using the public key of the public/private key pair generated for the user and an asymmetric encryption technique, the data key (operation 628), and send the encrypted data key to user device 600 (operation 630). Upon receiving the encrypted data key, user device 600 can perform a decryption operation using the corresponding private key to obtain the data key (operation 632). Subsequently, the user can perform the necessary encryption/decryption operations on sensitive data. For example, the user may encrypt certain sensitive data using the data key before storing the sensitive data on user device 600, or the user may need to use the data key to decrypt previously encrypted data.

In some embodiments, in addition to the user ID, the user may need to send his own digital certificate to facilitate user authentication. Moreover, instead of sending the data key to the user device, the voiceprint-and-encryption-key-management subsystem may perform the encryption/decryption operation on behalf of the user. To do so, the user may send the to-be-encrypted (or decrypted) message to the voiceprint-and-encryption-key-management subsystem.

Figure 7:
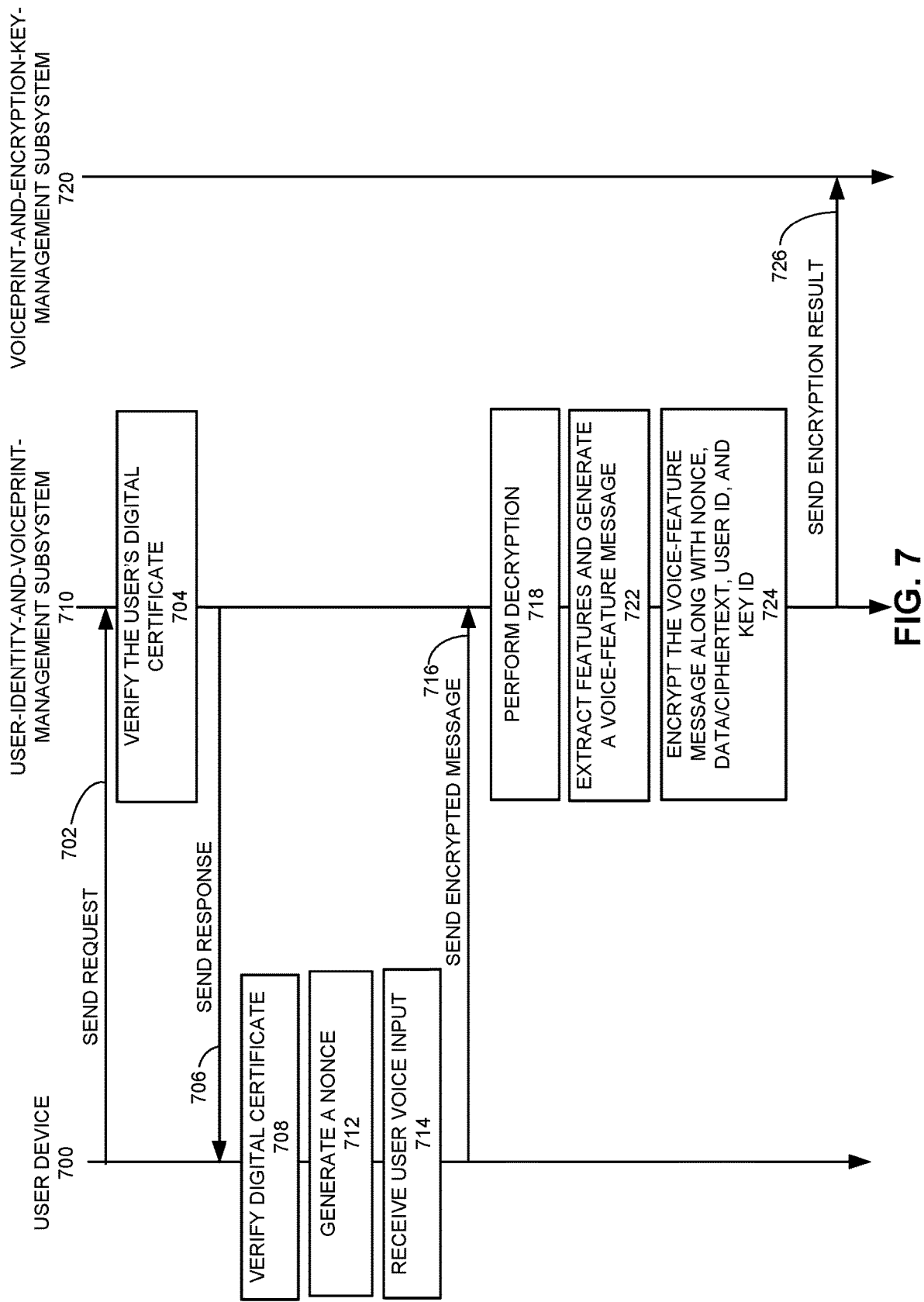
FIG. 7 illustrates an exemplary process for secure usage of data keys, according to one embodiment.

FIG. 7 illustrates an exemplary process for secure usage of data keys, according to one embodiment. During operation, a user can send, via user device 700, a key request to user-identity-and-voiceprint-management subsystem 710 (operation 702). In some embodiments, the key request can include the user's digital certificate (Cert_U), the user ID ($U_{ID}$), and a handle or identifier of the key ($key_{ID}$). The user's digital certificate can be a certificate obtained by the user from a third-party certificate authority (CA). The key request can also be encrypted using the public key of user-identity-and-voiceprint-management subsystem 710 and an asymmetrical encryption technique.

In response, user-identity-and-voiceprint-management subsystem 710 verifies the user's digital certificate (operation 704), and sends a response to user device 700 (operation 706). The response can include the digital certificate of user-identity-and-voiceprint-management subsystem 710 and a prompt for the user to provide a voice message.

Upon receiving the response, user device 700 can verify the received digital certificate (operation 708). If the received digital certificate is valid, user device 700 can generate a nonce (operation 712) and receive the user's voice input (operation 714). User device 700 can then send an encrypted message that comprises the user's voice input, the nonce, and the to-be-encrypted data and/or to-be-decrypted ciphertext (operation 716). The message is encrypted using the public key (I_PK) of user-identity-and-voiceprint-management subsystem 710 and an asymmetrical encryption technique.

Upon receiving the encrypted message, user-identity-and-voiceprint-management subsystem 710 performs a decryption operation (operation 718), using its own private key (I_SK), to obtain the user's voice input, the nonce, and the data and/or ciphertext. User-identity-and-voiceprint-management subsystem 710 can then extract voiceprint features from the voiceprint of the received user's voice input and generate a voice-feature message (denoted msg) based on the extracted features (operation 722). Subsequently, user-identity-and-voiceprint-management subsystem 710 can encrypt, using the public key (M_PK) of voiceprint-and-encryption-key-management subsystem 720 and an asymmetrical encryption technique, the voice-feature message, the nonce, the data and/or ciphertext, the user ID, and the key ID (operation 724). User-identity-and-voiceprint-management subsystem 710 can then send the encryption result to voiceprint-and-encryption-key-management subsystem 720 (operation 726).

Voiceprint-and-encryption-key-management subsystem 720 can perform the corresponding decryption operation using its own private key (M_SK) to obtain msg, the nonce, data/ciphertext, the $U_{ID}$, and the $key_{ID}$ (operation 728). Based on the user ID, voiceprint-and-encryption-key-management subsystem 720 looks up voiceprint features stored within voiceprint-and-encryption-key-management subsystem 720 (operation 730), and compares the stored voiceprint features with the received voiceprint feature (operation 732). A matching result authenticates the user; otherwise, the process terminates.

Upon successful authentication of the user, voiceprint-and-encryption-key-management subsystem 720 can retrieve the data key corresponding to the user ID and key ID (operation 734), and perform the requested encryption or decryption operation to obtain ciphertext or data corresponding to the received data or ciphertext (operation 736).

To ensure data transmission security, voiceprint-and-encryption-key-management subsystem 720 can also compute a hash based on the newly obtained ciphertext or data and the nonce (operation 738), and send the hash along with encrypted (using the private key of the public/private key pair generated for the user, i.e., U_SK) ciphertext and/or data (operation 740). In other words, voiceprint-and-encryption-key-management subsystem 720 sends {hash (ciphertext/data, nonce), [ciphertext/data]$_{U\_SK}$} to user device 700.

Upon receiving the encrypted message, user device 700 can perform the corresponding decryption operation using the user's private key U_SK to obtain the ciphertext and/or data and compute the hash based on the obtained ciphertext and/or data and the nonce (operation 742). User device 700 can compare the computed hash with the received hash (operation 744). A matching result can indicate that the received ciphertext and/or data is complete, and user device 700 can keep the ciphertext and/or data. Otherwise, user device 700 can discard the ciphertext and/or data.

Figure 8:
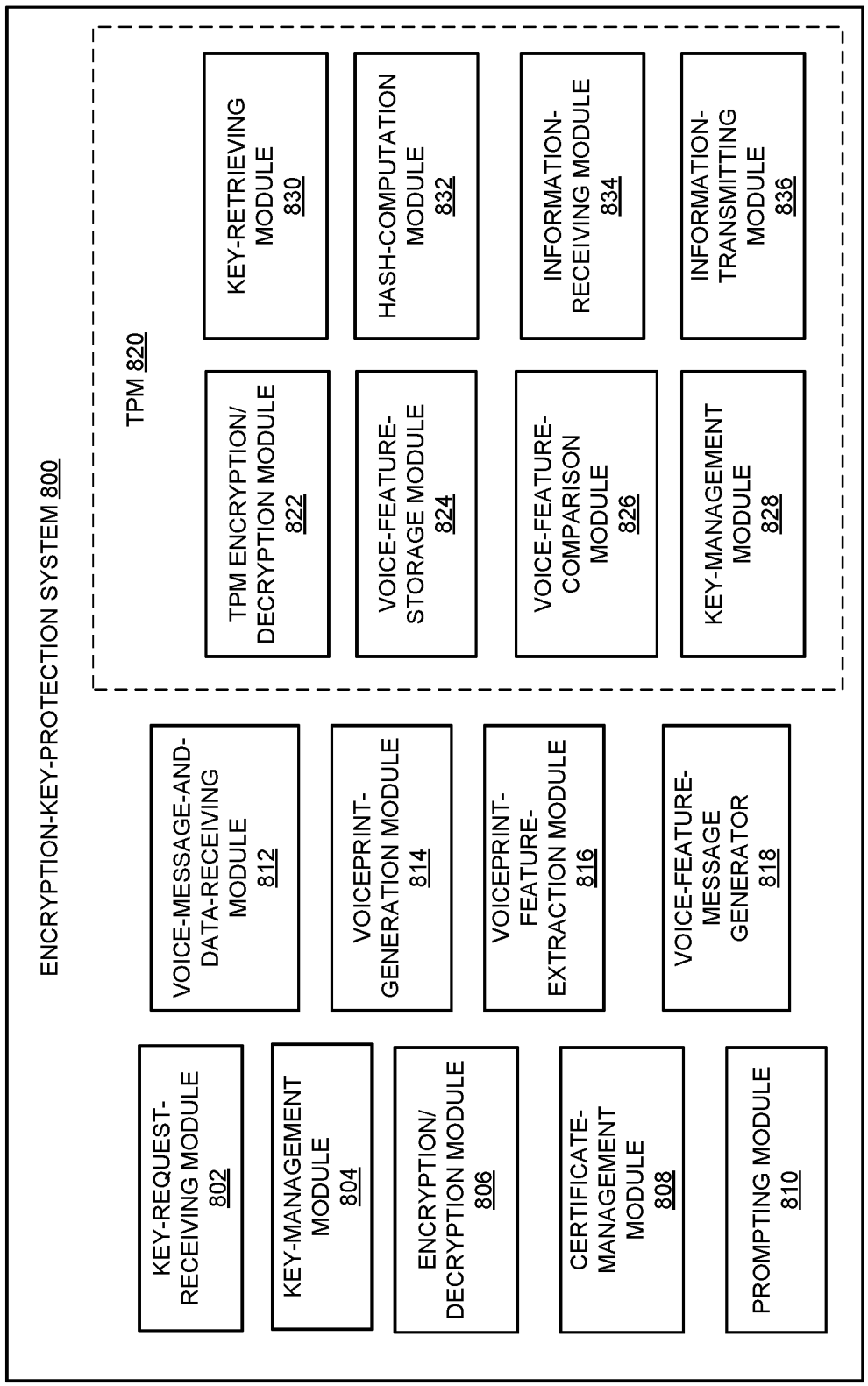
FIG. 8 shows a block diagram of an exemplary encryption-key-protection system, according to one embodiment.

FIG. 8 shows a block diagram of an exemplary encryption-key-protection system, according to one embodiment. Encryption-key-protection system 800 can include a key-request-receiving module 802, a key-management module 804, an encryption/decryption module 806, a certificate-management module 808, a prompting module 810, a voice-message-and-data-receiving module 812, a voiceprint-generation module 814, a voiceprint-feature-extraction module 816, a voice-feature-message generator 818, and a TPM 820. TPM 820 can further include a TPM encryption/decryption module 822, a voice-feature-storage module 824, a voice-feature-comparison module 826, a key-management module 828, a key-retrieving module 830, a hash-computation module 832, an information-receiving module 834, and an information-transmitting module 836. Note that TPM 820 can be located on the same server computer along with the other modules within encryption-key-protection system 800, or TPM 820 can be located on a separate server computer but can be coupled to the one or more server computers that host the remaining modules of encryption-key-protection system 800. Moreover, the entire encryption-key-protection system can be part of a client device, which itself can be a trusted platform that includes a TPM.

Key-request-receiving module 802 is responsible for receiving a key request. Note that the key request may be received from a separate user device or from a user application running on the same platform as encryption-key-protection system 800. In some embodiments, the key request can include a user ID and a key ID, specifying the user and the key being requested. The key request can optionally include the requesting user's digital certificate, which is issued by a third-party CA. The key request can also be encrypted, using an asymmetric encryption technique and a public key of encryption-key-protection system 800.

Key-management module 804 maintains and manages encryption keys used outside of TPM module 802. More specifically, key-management module 804 maintains and manages the public/private key pair of encryption-key-protection system 800. Encryption/decryption module 806 can be responsible for performing encryption/decryption operations using keys retrieved from key-management module 804. For example, encryption/decryption module 806 can retrieve the private key of encryption-key-protection system 800 and use the retrieved key to decrypt the received key request.

Certificate-management module 808 can be responsible for managing the various digital certificates used in the system, including verifying a digital certificate received from the user or maintaining the digital certificate for encryption-key-protection system 800. In some embodiments, messages exchanged between the user and encryption-key-protection system 800 can be accompanied by the corresponding certificates. For example, the key request sent from the user to encryption-key-protection system 800 can include the user's digital certificate, and certificate-management module 808 can verify the user's digital certificate. Moreover, the response sent from encryption-key-protection system 800 to the user can also include the digital certificate of encryption-key-protection system 800.

Prompting module 810 can be responsible for generating a prompt, which can be displayed on the user device to prompt the user to input a voice message. Voice-message-and-data-receiving module 812 can be responsible for receiving the user's voice message and user data. The user data can include to-be-encrypted plaintext, to-be-decrypted ciphertext, or both. Voiceprint-generation module 814 can be responsible for generating a voiceprint for the received user's message. Voiceprint-feature-extraction module 816 can be responsible for extracting features from the generated voiceprint. Depending on the feature-extraction algorithm, different types of features can be extracted from the voiceprint. For example, if the MFCC feature-extraction algorithm is used, MFCC features will be extracted from the voiceprint. Voice-feature-message generator 818 can be responsible for generating and transmitting a message (can be referred to as a voice-feature message) that includes the extracted voiceprint features to TPM 820. In some embodiments, the voice-feature-message can include a header indicating the types of voice features included in the voice-feature message. Moreover, the voice-feature message can be encrypted, along with the user ID and the key ID, by encryption/decryption module 806 using the public key of TPM 820.

Information-receiving module 834 within TPM 820 can be responsible for receiving the voice-feature message along with components included in the key request, such as the nonce, data/ciphertext, user ID, and key ID. In some embodiments, the received information is encrypted using the public key of TPM 820 and an asymmetric encryption technique. TPM encryption/decryption module 822 can be responsible for performing encryption/decryption operations within TPM 820. For example, TPM encryption/decryption module 822 can decrypt the received voice-feature message using the private key of TPM 820.

Voice-feature-storage module 824 can be responsible for storing the voice features extracted from users' voice inputs when the users establish their account. The stored voice features can be indexed using the user ID. Voice-feature-comparison module 826 can be responsible for looking up voiceprint features stored in voice-feature-storage module 824 based on the user ID accompanying the received voice-feature message, and for comparing the stored voiceprint features with the voiceprint features included in the voice-feature message. A matching result authenticates the user. Otherwise, user authentication fails and the user is denied access to the encryption keys stored in key-management module 828.

Key-management module 828 can be responsible for generating, storing, and managing various secret keys. For example, it stores the private key of TPM 820. Moreover, when a user establishes an account with encryption-key-protection system 800, key-management module 828 can generate one or more encryption keys for the user such that the user can use these encryption keys to protect his data. These user encryption keys can be indexed using the user ID and the key ID.

Once voice-feature-comparison module 826 produces a positive matching result, meaning that the user has been authenticated based on his voice, key-retrieving module 830 can retrieve, from key-management module 828, an encryption key based on the user ID and key ID accompanying the voice-feature message. TPM encryption/decryption module 822 can then use the retrieved encryption key to perform the encryption or decryption operation on the plaintext data or ciphertext received from the user. Note that such plaintext data or ciphertext can be sent to TPM module 820 along with the voice-feature message. Moreover, TPM encryption/decryption module 822 can further encrypt, using the public key of the public/private key pair generated for the user (also referred to as the user's platform public key), the previous encryption/decryption output.

Hash-computation module 832 can be responsible for calculating a hash value based on the ciphertext/plaintext outputted by TPM encryption/decryption module 822. In some embodiments, TPM 820 can also receive a nonce along with the voice-feature message, and hash-computation module 832 can calculate a hash value of the ciphertext/plaintext along with the nonce. Information-transmitting module 836 can transmit information, including the calculated hash value of the ciphertext/plaintext plus the nonce, and the ciphertext/plaintext encrypted using the user's platform public key, to the user device. Transmitting both the hash value and the encrypted ciphertext/plaintext to the user can allow the user to verify the integrity of the ciphertext/plaintext. For example, upon receiving the hash value and the encrypted ciphertext/plaintext, the user can first perform a decryption operation using his platform private key to obtain the ciphertext/plaintext transmitted by TPM 820. Subsequently, the user can calculate a hash value using the obtained ciphertext/plaintext and the nonce. By comparing the calculated hash value with the received hash value, the user can verify the integrity of the received ciphertext/plaintext.

In some embodiments, the user device may have sufficient computation power and may not send the to-be-encrypted plaintext data or to-be-decrypted ciphertext. In such a scenario, information-transmitting module 836 can transmit the requested user encryption to the user. The requested user encryption key can also be encrypted by TPM encryption/decryption module 822 using the user's platform public key before it is sent to the user. Upon receipt of the information, the user can perform a decryption operation using his platform private key to obtain the encryption key. Once the user obtains the encryption key, the user can use the encryption key to protect his data, either for storage or for communicating with other entities. Because the encryption has been protected by the hardware module (e.g., TPM 820), it is less likely to be tempered.

In general, embodiments disclosed herein provide a solution to the technical problem of providing a user with password-free but secure access to encryption keys managed and maintained by hardware modules. As discussed previously, the hardware-protected encryption keys can provide enhanced security. Because the system uses a user's voice as a way to authenticate the user, the user no longer needs to remember a password or there is no longer a need for additional password-management equipment. In the examples shown in FIGS. 4-8, hardware modules, such as a TPM, used in a trusted computing environment can be used to protect and manage the user's encryption keys. In practice, other types of security hardware, such as an HSM or a TPCM, can also be used to protect and manage the user's encryption keys, as long as they are equipped with the required modules for storing voice-features and for comparison of stored voice features with received voice features. The encryption-key-protection system can be part of a server that manages the encryption keys for the user. The hardware module can be part of the server or a peripheral device coupled to the server. Moreover, the encryption-key-protection system can be part of the client device, which receives the user's voice input. The hardware module can be part of the client device or a peripheral device coupled to the client device. In such a scenario, the client device receives the key request from the user and retrieves the requested key from the hardware module.

Figure 9:
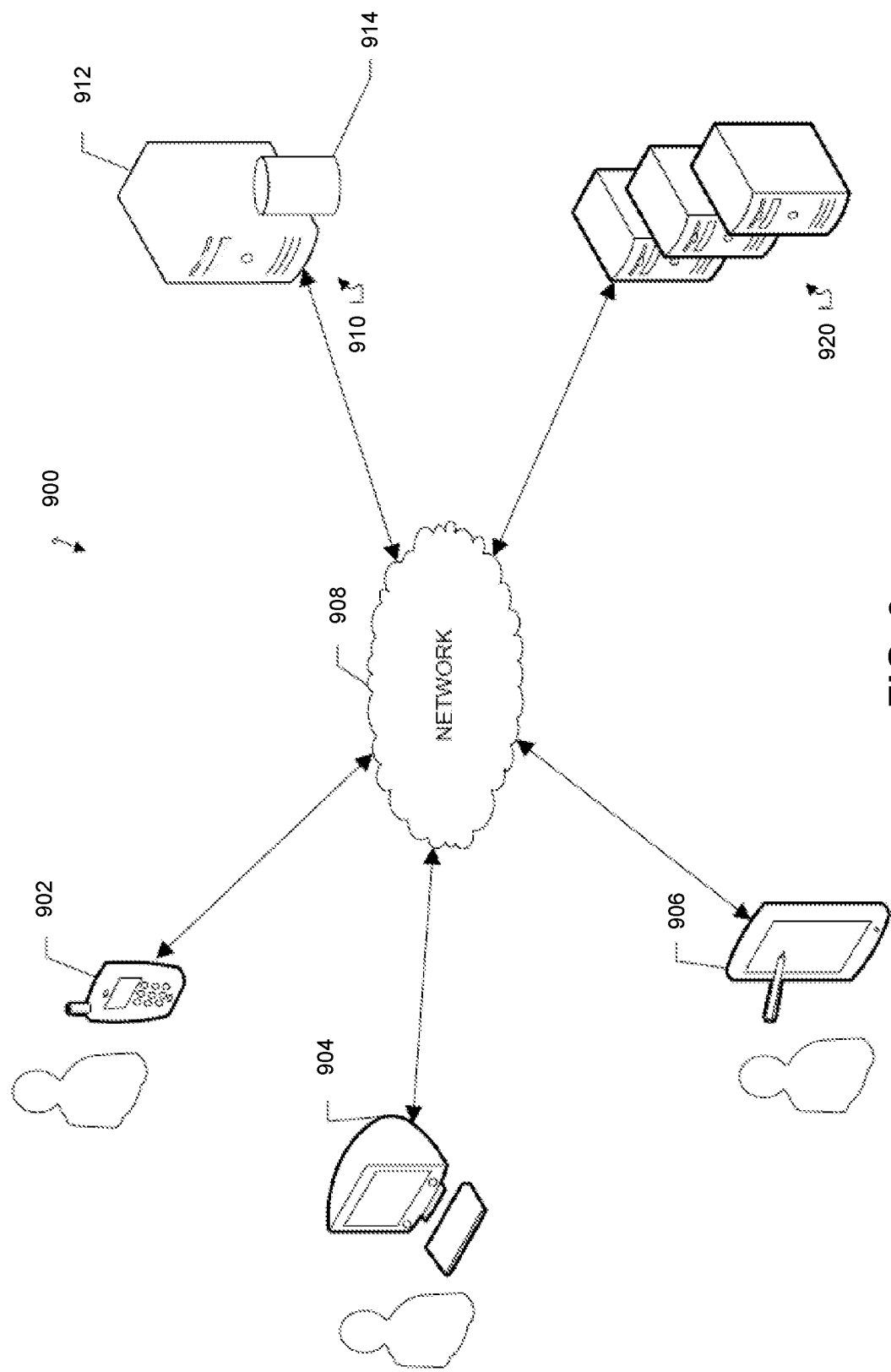
FIG. 9 illustrates an exemplary client-server network environment for implementing the disclosed eavesdropping-detection technology, in accordance with some embodiments described herein.

FIG. 9 illustrates an exemplary client-server network environment for implementing the disclosed eavesdropping-detection technology, in accordance with some embodiments described herein. A network environment 900 includes a number of electronic devices 902, 904 and 906 communicably connected to a server 910 by a network 908. One or more remote servers 920 are further coupled to the server 910 and/or the one or more electronic devices 902, 904 and 906.

In some exemplary embodiments, electronic devices 902, 904 and 906 can be computing devices such as laptop or desktop computers, smartphones, PDAs, portable media players, tablet computers, televisions or other displays with one or more processors coupled thereto or embedded therein, or other appropriate computing devices that can be used for displaying a web page or web application. In one example, the electronic devices 902, 904 and 906 store a user agent such as a browser or application. In the example of FIG. 9, electronic device 902 is depicted as a smartphone, electronic device 904 is depicted as a desktop computer, and electronic device 906 is depicted as a PDA.

Server 910 includes a processing device 912 and a data store 914. Processing device 912 executes computer instructions stored in data store 914, for example, to assist in scheduling a customer-initiated service or a service-provider-initiated service between a service provider and a customer at electronic devices 902, 904 and 906 during a service scheduling process.

In some exemplary aspects, server 910 can be a single computing device such as a computer server. In other embodiments, server 910 can represent more than one computing device working together to perform the actions of a server computer (e.g., cloud computing). The server 910 may host the web server communicably coupled to the browser at the client device (e.g., electronic devices 902, 904 or 906) via network 908. In one example, the server 910 may host a client application for scheduling a customer-initiated service or a service-provider-initiated service between a service provider and a customer during a service scheduling process. Server 910 may further be in communication with one or more remote servers 920 either through the network 908 or through another network or communication means.

The one or more remote servers 920 may perform various functionalities and/or storage capabilities described herein with regard to the server 910 either alone or in combination with server 910. Each of the one or more remote servers 920 may host various services. For example, servers 920 may host services providing information regarding one or more suggested locations such as web pages or websites associated with the suggested locations; services for determining the location of one or more users, or establishments; search engines for identifying results for a user query, one or more user review or query services; or one or more other services providing information regarding one or more establishments, customers and/or reviews or feedback regarding the establishments.

Server 910 may further maintain or be in communication with social networking services hosted on one or more remote servers 920. The one or more social networking services may provide various services and may enable users to create a profile and associate themselves with other users at a remote social networking service. The server 910 and/or the one or more remote servers 920 may further facilitate the generation and maintenance of a social graph including the user-created associations. The social graphs may include, for example, a list of all users of the remote social networking service and their associations with other users of the remote social networking service.

Each of the one or more remote servers 920 can be a single computing device such as a computer server or can represent more than one computing device working together to perform the actions of a server computer (e.g., cloud computing). In one embodiment server 910 and one or more remote servers 920 may be implemented as a single server or a cluster of servers. In one example, server 910 and one or more remote servers 920 may communicate through the user agent at the client device (e.g., electronic devices 902, 904 or 906) via network 908.

Users may interact with the system hosted by server 910, and/or one or more services hosted by remote servers 920, through a client application installed at the electronic devices 902, 904, and 906. Alternatively, the user may interact with the system and the one or more social networking services through a web-based browser application at the electronic devices 902, 904, and 906. Communication among client devices 902, 904, 906 and the system, and/or one or more services, may be facilitated through a network (e.g., network 908).

Communication among the client devices 902, 904, 906, server 910 and/or one or more remote servers 920 may be facilitated through various communication protocols. In some aspects, client devices 902, 904, 906, server 910 and/or one or more remote servers 920 may communicate wirelessly through a communication interface (not shown), which may include digital signal processing circuitry where necessary. The communication interface may provide for communication under various modes or protocols, including Global System for Mobile communication (GSM) voice calls; Short Message Service (SMS), Enhanced Messaging Service (EMS), or Multimedia Messaging Service (MMS) messaging; Code Division Multiple Access (CDMA); Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, including via the use of a Bluetooth-enabled device, WiFi®, or other such transceiver.

Network 908 can include, for example, any one or more of a personal area network (PAN), a local area network (LAN), a campus area network (CAN), a metropolitan area network (MAN), a wide area network (WAN), a broadband network (BBN), the Internet, and the like. Further, network 908 can include, but is not limited to, any one or more of the following network topologies: including a bus network, a star network, a ring network, a mesh network, a star-bus network, a tree or hierarchical network, and the like.

Figure 10:
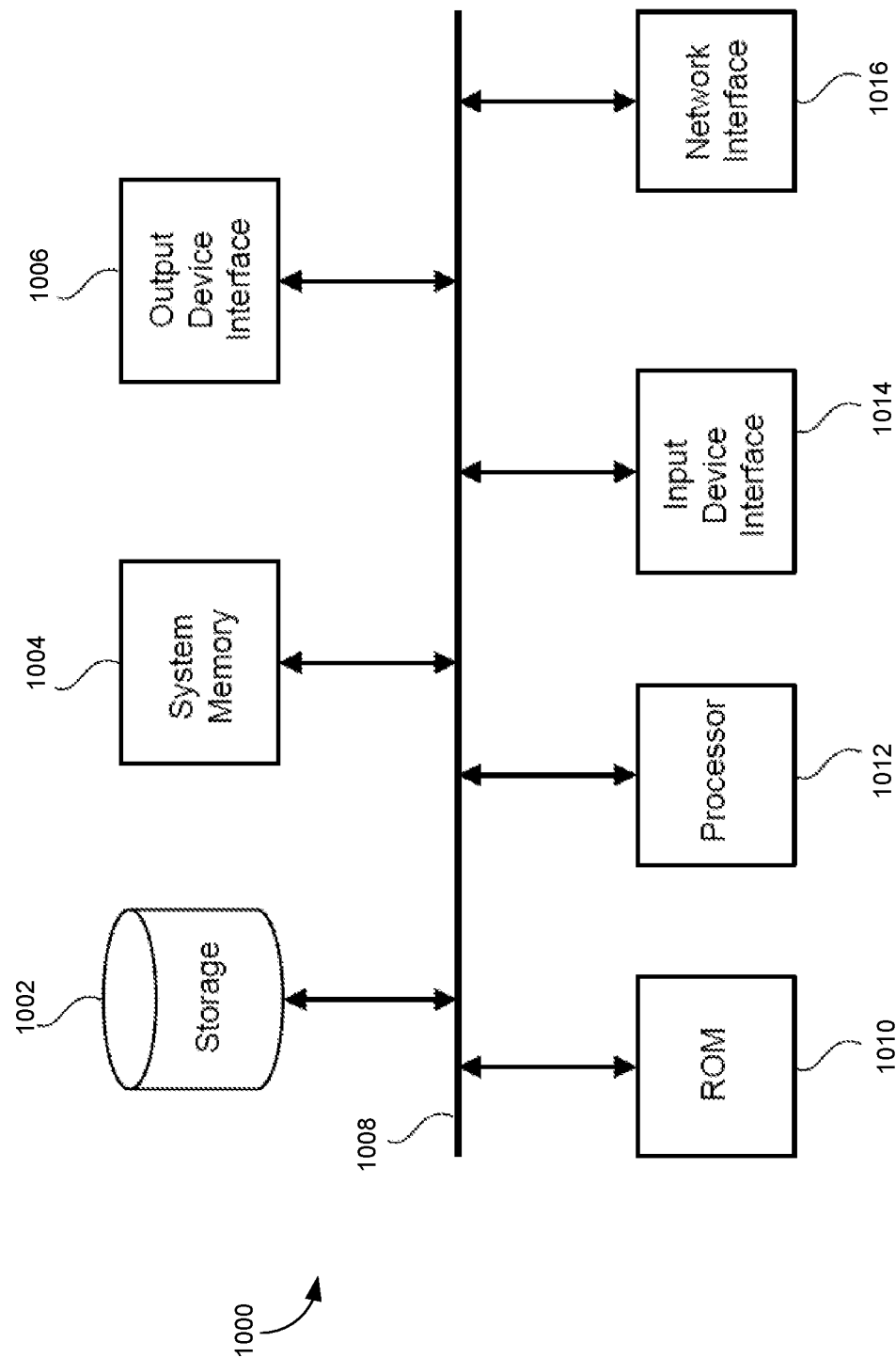
FIG. 10 conceptually illustrates an electronic system with which some implementations of the subject technology are implemented.

FIG. 10 conceptually illustrates an electronic system with which some implementations of the subject technology are implemented. Electronic system 1000 can be a client, a server, a computer, a smartphone, a PDA, a laptop, or a tablet computer with one or more processors embedded therein or coupled thereto, or any other sort of electronic device. Such an electronic system includes various types of computer-readable media and interfaces for various other types of computer-readable media. Electronic system 1000 includes a bus 1008, processing unit(s) 1012, a system memory 1004, a read-only memory (ROM) 1010, a permanent storage device 1002, an input device interface 1014, an output device interface 1006, and a network interface 1016.

Bus 1008 collectively represents all system, peripheral, and chipset buses that communicatively connect the numerous internal devices of electronic system 1000. For instance, bus 1008 communicatively connects processing unit(s) 1012 with ROM 1010, system memory 1004, and permanent storage device 1002.

From these various memory units, processing unit(s) 1012 retrieves instructions to execute and data to process in order to execute the processes of the subject disclosure. The processing unit(s) can be a single processor or a multi-core processor in different implementations.

ROM 1010 stores static data and instructions that are needed by processing unit(s) 1012 and other modules of electronic system 1000. Permanent storage device 1002, on the other hand, is a read-and-write memory device. This device is a non-volatile memory unit that stores instructions and data even when electronic system 1000 is off. Some implementations of the subject disclosure use a mass-storage device (such as a magnetic or optical disk and its corresponding disk drive) as permanent storage device 1002.

Other implementations use a removable storage device (such as a floppy disk, flash drive, and its corresponding disk drive) as permanent storage device 1002. Like permanent storage device 1002, system memory 1004 is a read-and-write memory device. However, unlike storage device 1002, system memory 1004 is a volatile read-and-write memory, such as random access memory. System memory 1004 stores some of the instructions and data that the processor needs at runtime. In some implementations, the processes of the subject disclosure are stored in system memory 1004, permanent storage device 1002, and/or ROM 1010. From these various memory units, processing unit(s) 1012 retrieves instructions to execute and data to process in order to execute the processes of some implementations.

Bus 1008 also connects to input and output device interfaces 1014 and 1006, respectively. Input device interface 1014 enables the user to communicate information and to select commands on the electronic system. Input devices used with input device interface 1014 include, for example, alphanumeric keyboards and pointing devices (also called "cursor control devices"). Output device interface 1006 enables, for example, the display of images generated by electronic system 1000. Output devices used with output device interface 1006 include, for example, printers and display devices, such as cathode ray tubes (CRTs) or liquid crystal displays (LCDs). Some implementations include devices such as a touchscreen that functions as both an input and output device.

Finally, as shown in FIG. 10, bus 1008 also couples electronic system 1000 to a network (not shown) through a network interface 1016. In this manner, the computer can be part of a network of computers (such as a local area network ("LAN"), a wide area network ("WAN"), an intranet, or a network of networks, such as the Internet). Any or all components of electronic system 1000 can be used in conjunction with the subject disclosure.

The functions described above can be implemented in digital electronic circuitry or in computer software, firmware or hardware. The techniques can be implemented using one or more computer program products. Programmable processors and computers can be included in or packaged as mobile devices. The processes and logic flows can be performed by one or more programmable processors or by one or more programmable logic circuitry. General and special purpose computing devices and storage devices can be interconnected through communication networks.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating user access to encryption keys stored within a hardware module, the method comprising:
    receiving, by a computer comprising or coupled to the hardware module, a key request from the user, wherein the key request comprises a user identifier and a key identifier;
    receiving a voice message from the user;
    extracting voice features from a voiceprint associated with the received voice message;
    generating a voice-feature message based on the extracted voice features;
    encrypting the voice-feature message using a public key associated with the hardware module;
    sending the encrypted voice-feature message to the hardware module, which is configured to compare the extracted voice features included in the encrypted voice-feature message with corresponding voice features stored within the hardware module; and
    in response to the extracted voice features matching the corresponding voice features stored within the hardware module, retrieving, from the hardware module, an encryption key based on the user identifier and the key identifier.

2. The computer-implemented method of claim 1, further comprising transmitting the encryption key to the user, thereby allowing the user to perform encryption or decryption operations on user data using the encryption key.

3. The computer-implemented method of claim 1, wherein the key request further comprises to-be-encrypted user data or to-be-decrypted ciphertext, and wherein the method further comprises performing an encryption or decryption operation on the to-be-encrypted user data or the to-be-decrypted ciphertext, respectively, using the retrieved encryption key.

4. The computer-implemented method of claim 3, wherein the key request further comprises a nonce, and wherein the method further comprises:
encrypting, using a public key associated with the user, output of the encryption or decryption operation;
calculating a hash value based on the output of the encryption or decryption operation and the nonce; and
transmitting the encrypted output of the encryption or decryption operation and the hash value to the user, thereby allowing the user to verify integrity of the output of the encryption or decryption operation.

5. The computer-implemented method of claim 1, wherein the hardware module comprises a Trusted Platform Module (TPM), a Trusted Platform Control Module (TPCM), or a hardware security module (HSM).

6. The computer-implemented method of claim 1, further comprising:
receiving from the user a request to set up a user account;
displaying to the user a random alphanumeric string;
receiving a voice input from the user based on the displayed alphanumeric string;
extracting a second set of voice features from a voiceprint associated with the voice input; and
storing the extracted second set of voice features in the hardware module.

7. A computer system, comprising:
a processor;
a hardware module storing encryption keys; and
a storage device coupled to the processor and storing instructions, which when executed by the processor cause the processor to perform a method for facilitating user access to the encryption keys stored within the hardware module, the method comprising:
receiving a key request from the user, wherein the key request comprises a user identifier and a key identifier;
receiving a voice message from the user;
extracting voice features from a voiceprint associated with the received voice message;
generating a voice-feature message based on the extracted voice features;
encrypting the voice-feature message using a public key associated with the hardware module;
sending the encrypted voice-feature message to the hardware module, which is configured to compare the extracted voice features included in the encrypted voice-feature message with corresponding voice features stored within the hardware module; and
in response to the extracted voice features matching the corresponding voice features stored within the hardware module, retrieving, from the hardware module, an encryption key based on the user identifier and the key identifier.

8. The computer system of claim 7, wherein the method further comprises transmitting the encryption key to the user, thereby allowing the user to perform encryption or decryption operations on user data using the encryption key.

9. The computer system of claim 7, wherein the key request further comprises to-be-encrypted user data or to-be-decrypted ciphertext, and wherein the method further comprises performing an encryption or decryption operation on the to-be-encrypted user data or the to-be-decrypted ciphertext, respectively, using the retrieved encryption key.

10. The computer system of claim 9, wherein the key request further comprises a nonce, and wherein the method further comprises:
encrypting, using a public key associated with the user, output of the encryption or decryption operation;
calculating a hash value based on the output of the encryption or decryption operation and the nonce; and
transmitting the encrypted output of the encryption or decryption operation and the hash value to the user, thereby allowing the user to verify integrity of the output of the encryption or decryption operation.

11. The computer system of claim 7, wherein the hardware module comprises a Trusted Platform Module (TPM), a Trusted Platform Control Module (TPCM), or a hardware security module (HSM).

12. The computer system of claim 7, wherein the method further comprises:
receiving from the user a request to set up a user account;
displaying to the user a random alphanumeric string;
receiving a voice input from the user based on the displayed alphanumeric string;
extracting a second set of voice features from a voiceprint associated with the voice input; and
storing the extracted second set of voice features in the hardware module.

13. A hardware module for facilitating communication and data security, wherein the hardware module comprises:
a key-management module for storing and managing user encryption keys;
a voice-feature-storage module configured to store voices features for users;
an information-receiving module configured to receive a key request, which comprises a user identifier and a key identifier, and voice features associated with a user corresponding to the user identifier, wherein the information-receiving module is configured to receive an encrypted form of the key request and a voice-feature message comprising the voice features, and wherein the key request and the voice-feature message are encrypted using a public key associated with the hardware module;
a voice-feature-comparison module configured to compare voice features corresponding to the user identifier stored within the voice-feature-storage module and the voice features included in the encrypted voice-feature message; and
a key-retrieving module configured to retrieve an encryption key corresponding to the key identifier and the user identifier in response to the voice-feature-comparison module outputting a positive comparison result.

14. The hardware module of claim 13, further comprising an information-transmitting module configured to transmit the retrieved encryption key to the user, thereby allowing the user to perform encryption or decryption operations on user data using the encryption key.

15. The hardware module of claim 13, wherein the key request further comprises to-be-encrypted user data or to-be-decrypted ciphertext, and wherein the hardware module further comprises an encryption/decryption module configured to perform an encryption or decryption operation on the to-be-encrypted user data or the to-be-decrypted ciphertext, respectively, using the retrieved encryption key.

16. The hardware module of claim 15,
wherein the key request further comprises a nonce, wherein the hardware module further comprises a hash-computation module configured to compute a hash value based on the output of the encryption or decryption operation and the nonce;
wherein the encryption/decryption module is further configured to encrypt, using a public key associated with the user, output of the encryption or decryption operation; and
wherein the hardware module further comprises an information-transmitting module configured to transmit the encrypted output of the encryption or decryption operation and the hash value to the user, thereby allowing the user to verify integrity of the output of the encryption or decryption operation.

17. The hardware module of claim 13, wherein the hardware module is a Trusted Platform Module (TPM), a Trusted Platform Control Module (TPCM), or a hardware security module (HSM).

* * * * *